(12) United States Patent
Elangovan et al.

(10) Patent No.: US 10,585,478 B2
(45) Date of Patent: Mar. 10, 2020

(54) METHODS AND SYSTEMS FOR INTEGRATING ONE OR MORE GESTURAL CONTROLLERS INTO A HEAD MOUNTED WEARABLE DISPLAY OR OTHER WEARABLE DEVICES

(71) Applicant: Nod, Inc., Santa Clara, CA (US)

(72) Inventors: Anusankar Elangovan, San Francisco, CA (US); Harsh Menon, Cupertino, CA (US)

(73) Assignee: Nod, Inc., Santa Clara, CA (US)

( * ) Notice: Subject to any disclaimer, the term of this patent is extended or adjusted under 35 U.S.C. 154(b) by 487 days.

(21) Appl. No.: 14/637,351

(22) Filed: Mar. 3, 2015

(65) Prior Publication Data

US 2015/0241969 A1    Aug. 27, 2015

Related U.S. Application Data

(63) Continuation-in-part of application No. 14/487,039, filed on Sep. 15, 2014, now Pat. No. 10,139,914.

(60) Provisional application No. 61/877,933, filed on Sep. 13, 2013.

(51) Int. Cl.
| | | |
|---|---|---|
| *G06F 3/01* | (2006.01) |
| *G02B 27/01* | (2006.01) |
| *G05G 9/047* | (2006.01) |
| *G06F 3/0338* | (2013.01) |
| *G06F 3/0346* | (2013.01) |

(52) U.S. Cl.
CPC .......... *G06F 3/014* (2013.01); *G02B 27/017* (2013.01); *G05G 9/047* (2013.01); *G06F 3/011* (2013.01); *G06F 3/012* (2013.01); *G06F 3/017* (2013.01); *G06F 3/0338* (2013.01); *G06F 3/0346* (2013.01); *G02B 2027/0178* (2013.01); *G06F 2203/0331* (2013.01); *G06F 2203/0384* (2013.01)

(58) Field of Classification Search
CPC .... G06F 3/017; G06F 3/04883; G06F 3/0487; G06F 3/0488; G06F 3/04886; G06F 2203/04808
See application file for complete search history.

(56) References Cited

U.S. PATENT DOCUMENTS

| | | | |
|---|---|---|---|
| 6,515,669 B1 | 2/2003 | Mohri | |
| 9,746,671 B2 * | 8/2017 | Fujigaki | G02B 27/017 |
| 9,782,648 B2 | 10/2017 | Decarlo | |
| 9,910,498 B2 | 3/2018 | Kutliroff | |
| 9,924,238 B2 * | 3/2018 | Glazer | H04N 21/8146 |

(Continued)

FOREIGN PATENT DOCUMENTS

WO    2012/099584    7/2012

OTHER PUBLICATIONS

International Search Report and Written Opinion dated Dec. 8, 2014 in corresponding PCT/US2014/055708.

*Primary Examiner* — William Lu
(74) *Attorney, Agent, or Firm* — Pillsbury Winthrop Shaw Pittman LLP

(57) ABSTRACT

Described are apparatus and methods for integrating gestural controllers in Head Mounted Displays, preferably for Virtual Reality and Augmented Reality applications. In a specific embodiment, multiple controllers are located on both sides of the HMD for ease of locating and wearing the controllers without having to remove the Head Mounted Display.

7 Claims, 6 Drawing Sheets

(56) References Cited

U.S. PATENT DOCUMENTS

| | | |
|---|---|---|
| 10,139,914 B2* | 11/2018 | Elangovan .............. G06F 3/011 |
| 10,171,736 B2* | 1/2019 | Ito ...................... H04N 5/23209 |
| 2006/0129070 A1 | 6/2006 | Pearl et al. |
| 2006/0161363 A1 | 7/2006 | Shibasaki et al. |
| 2007/0263001 A1 | 11/2007 | Trzecieski |
| 2008/0031512 A1 | 2/2008 | Mundermann et al. |
| 2008/0091373 A1 | 4/2008 | McGibbon et al. |
| 2010/0164862 A1 | 7/2010 | Sullivan et al. |
| 2011/0213664 A1 | 9/2011 | Osterhout et al. |
| 2011/0298827 A1 | 12/2011 | Perez |
| 2012/0019373 A1* | 1/2012 | Kruse ..................... G06F 3/014 340/407.2 |
| 2012/0093320 A1 | 4/2012 | Flaks et al. |
| 2012/0194645 A1 | 8/2012 | Fuller et al. |
| 2012/0212484 A1* | 8/2012 | Haddick ............ G02B 27/0093 345/419 |
| 2012/0249590 A1* | 10/2012 | Maciocci ................ G06F 3/011 345/633 |
| 2012/0319940 A1* | 12/2012 | Bress ..................... G06F 3/017 345/156 |
| 2012/0327194 A1 | 12/2012 | Shiratori et al. |
| 2014/0055352 A1 | 2/2014 | Davis et al. |
| 2014/0098018 A1 | 4/2014 | Kim et al. |
| 2014/0139422 A1 | 5/2014 | Mistry et al. |
| 2014/0282274 A1 | 9/2014 | Everitt et al. |
| 2014/0282275 A1 | 9/2014 | Everitt et al. |
| 2014/0358475 A1 | 12/2014 | Boulkenafed et al. |
| 2015/0077336 A1 | 3/2015 | Elangovan |
| 2015/0084840 A1* | 3/2015 | Kim ..................... G02B 27/017 345/8 |

\* cited by examiner

METHODS AND SYSTEMS FOR INTEGRATING ONE OR MORE GESTURAL CONTROLLERS INTO A HEAD MOUNTED WEARABLE DISPLAY OR OTHER WEARABLE DEVICES

RELATED APPLICATIONS

This application is a continuation-in-part of previously filed U.S. patent application Ser. No. 14/487,039 filed Sep. 15, 2014, which claims priority to U.S. Provisional Application No. 61/877,933 filed Sep. 13, 2013 and entitled "Methods and Apparatus for using the Human Body as an Input Device", and which are explicitly incorporated herein by reference.

FIELD OF THE ART

This disclosure relates to integrating gestural controllers into wearable head mounted displays (HMDs), preferably for Virtual Reality and Augmented Reality Applications.

BACKGROUND

Many conventional Head Mounted Displays lack integrated gestural input systems and rely on existing conventional input mechanisms such as a Gamepad, Keyboard or Mouse. Such conventional input mechanisms are not intuitive since they are usually not visible in the Virtual Reality environments.

SUMMARY

Described are apparatus and methods for integrating gestural controllers in Head Mounted Displays, preferably for Virtual Reality and Augmented Reality applications.

In a specific embodiment, multiple controllers are located on one or more sides of the HMD for ease of locating and wearing the controllers without having to remove the Head Mounted Display.

DETAILED DESCRIPTION OF THE PREFERRED EMBODIMENT

The embodiments described herein build on the concepts, hardware, software and functionality described in filed U.S. patent application Ser. No. 14/487,039 filed Sep. 14, 2014, which claims priority to U.S. Provisional Application No. 61/877,933 filed Sep. 13, 2013 and entitled "Methods and Apparatus for using the Human Body as an Input Device."

Figure 7:
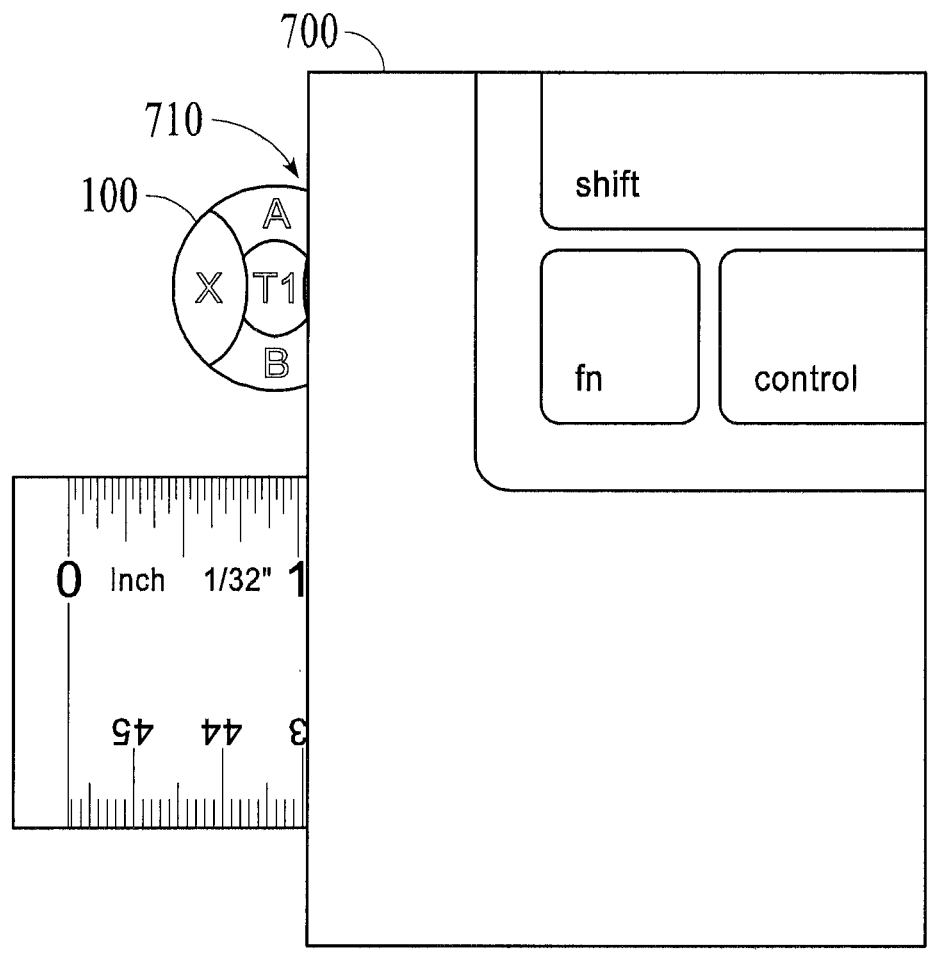
FIG. 7 is a top view of a gestural controller of FIG. 1 inserted for charging and storage into a compartment of a computer or other electronic device.

In one aspect, described herein is a gestural controller that can have more simplified functionality than the single sensor ring described in FIGS. 7 and 8 of U.S. patent application Ser. No. 14/487,039 mentioned above, though having the same or similar functionalities and structure, as well as different functionalities and structure consistent with the descriptions herein, are all within the intended scope. For purposes herein of distinguishing, the gestural controller described herein will be referred to as a single controller disk, though it is understood that various different embodiments of what is referred to herein as the single controller disk can exist, and the shapes can be many and are not limited to disks.

As described further herein, a plurality of single controller disks can be combined with holders that allow easy placement of the single controller disk onto various parts of the body. Accordingly, the single controller disk can be strapped onto the aims or legs or attached to other electronics that are worn on the body (e.g: Virtual Reality Headsets, Helmets, watches etc). Single controller disks can be charged collectively, and also enabled to allow a plurality of them to be used to track different parts of the body, each single controller disk preferably tracking the motion of the part of the body to which it is attached. Each single controller disk could, in a preferred embodiment, enter a lower power state if that part of the body isn't being actively tracked.

Figure 1A:
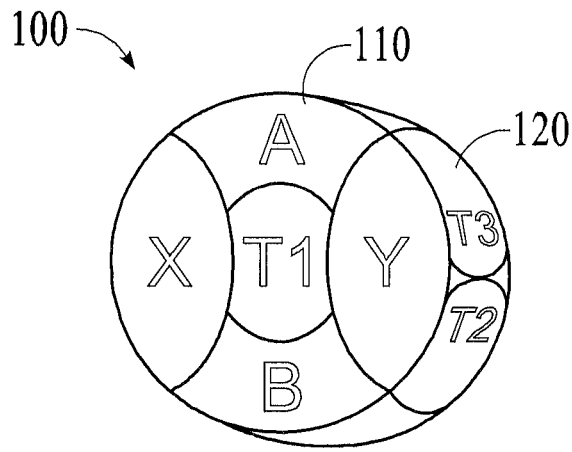
FIGS. 1A-C is an embodiment of a gestural controller according to an embodiment described herein
Figure 1B:
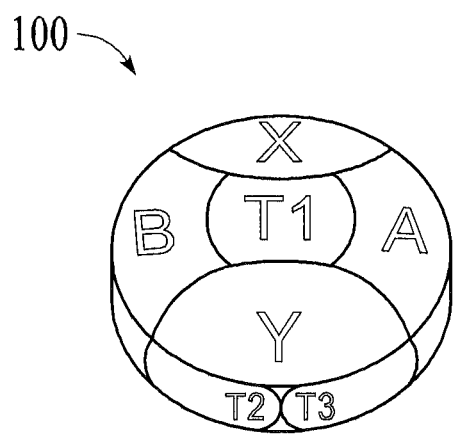
Figure 1C:
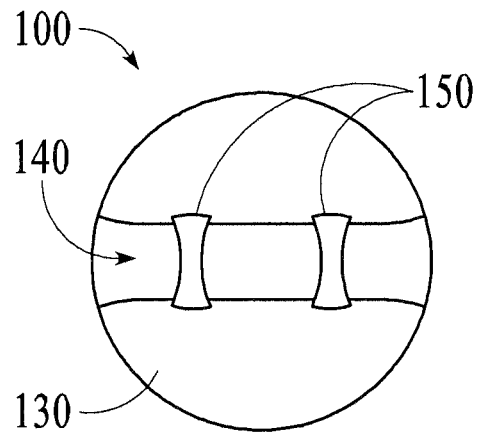

FIGS. 1A-C illustrate a single controller disk gestural controller 100 according to one embodiment. A single controller disk 100 is very small, typically having dimensions in the range of 25 mm*25 mm or less, and is a motion sensor unit that can track motion very accurately with MEMS sensor technology. A plurality of single controller disks have the ability to synchronize between themselves on when they can start tracking and when they go into a deep sleep state. In a preferred embodiment, one single controller disk can be used to track if there is any motion of the body and when there is motion, that single controller disk can wake up the other single controller disks to start tracking.

As illustrated in FIG. 1A, a single controller disk 100 in a preferred embodiment has elements A, B, X, Y and T1 on a front face 110, and elements T2 and T3 on a side face 120. Elements A, B and X, Y are buttons that each provide a digital output (typically one bit corresponding to "pressed" or "not pressed", but may also be multi-bit) whereas elements T1, T2 and T3 are touch sensitive tactile sensors, which allow for discrimination by touching, thereby creating a signal that can be used for control purposes.

In a preferred embodiment, as shown in FIG. 1A, the exposed front face surface of element B is flat, whereas in the embodiment of FIG. 1B, the exposed front face surface of elements A, B, X and Y are each contoured, thereby providing for a tactile difference and assist a user in feeling the location of each merely by touch. In both these embodiments, T1, T2 and T3 are located on a side surface, as illustrated.

FIG. 1C illustrates a back-side 130 of a single controller disk 100, which contains a band 140 that includes a metal insert 150 that allows for attachment to a ring, strap, or HMD device with a snap-fit, as described further herein. The metal insert also provides a ground reference for measuring the capacitive touch.

Single controller disks 100 can also share information such as compass calibration and tracking information with each other to allow other single controller disks to converge faster in calibration since they have a baseline to start from.

Figure 2:
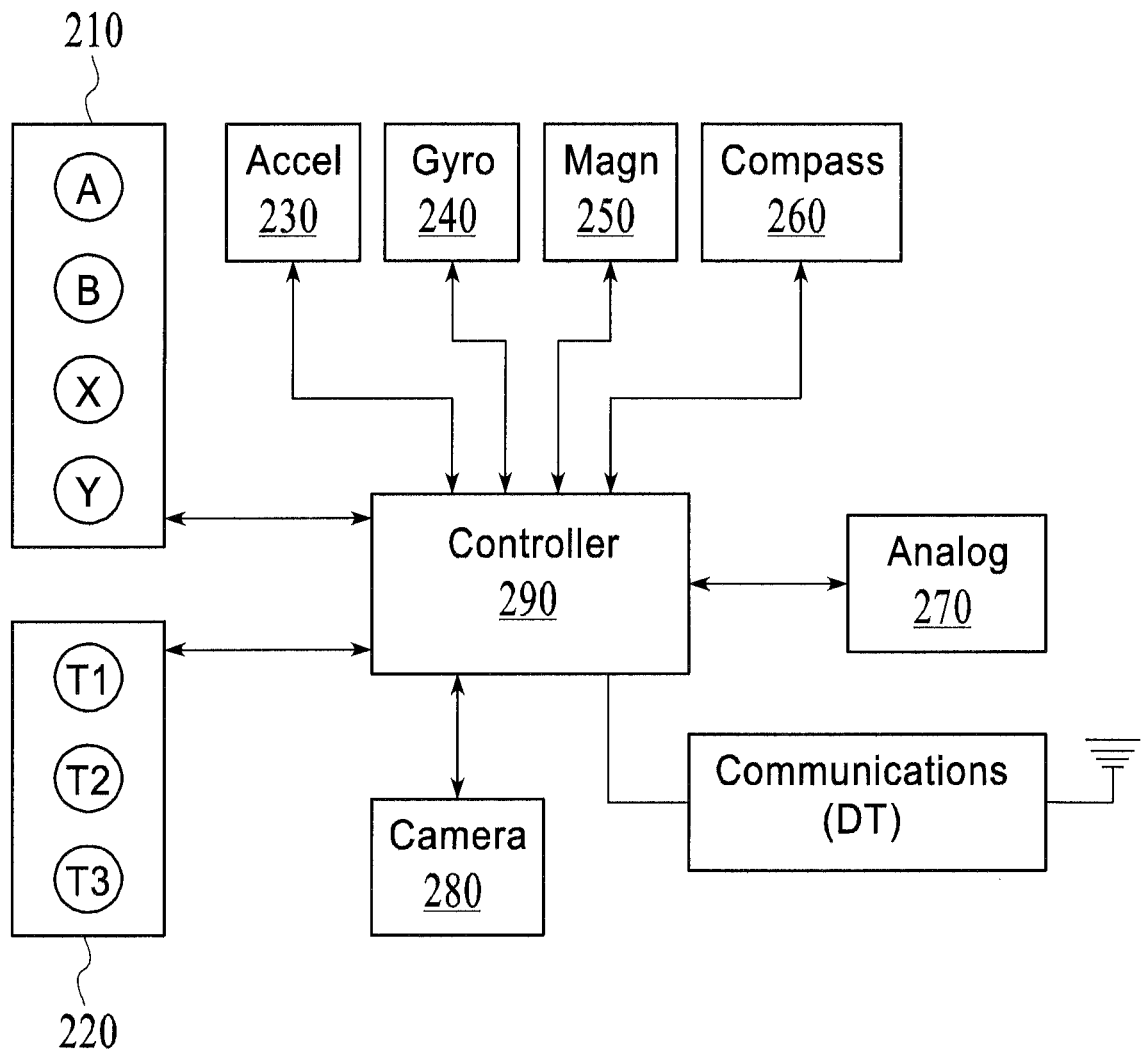
FIG. 2 is a functional schematic of the gestural controller of FIG. 1.

FIG. 2 is a functional schematic of the single controller disk gestural controller of FIG. 1. The internal components of the single controller disk 100, to which each of the elements A, B, X, Y and T1, are further described, but generally include digital output buttons 210—A, B, X, Y that each provide a digital output, touch sensitive tactile sensors 220-T1, T2 and T3, as well as one or more sensors. The sensors can be an accelerometer 230, a gyroscope 240 and a magnetometer 250. Optionally a compass 260 can be included as well. In a game controller version that is described herein, an analog controller switch/joystick device 270 that provides an analog input (that is then A/D converted) is also included. In a particular embodiment, a camera 280 provides a stream of image data that is used as described herein. Data from these various components are fed into a controller 290, which operates on software as described herein, and has a processor, RAM and ROM memory, A/D and D/A conversion as necessary for the application, and other conventional software processing elements, such as a display and display interface elements for a version that contains that. In a preferred embodiment a microcontroller that has a processor, RAM and ROM all included within a single chip can be advantageous.

Communication between the HMD and the disks is wireless, using Bluetooth or other conventional short-distance low-power means.

Figure 3:
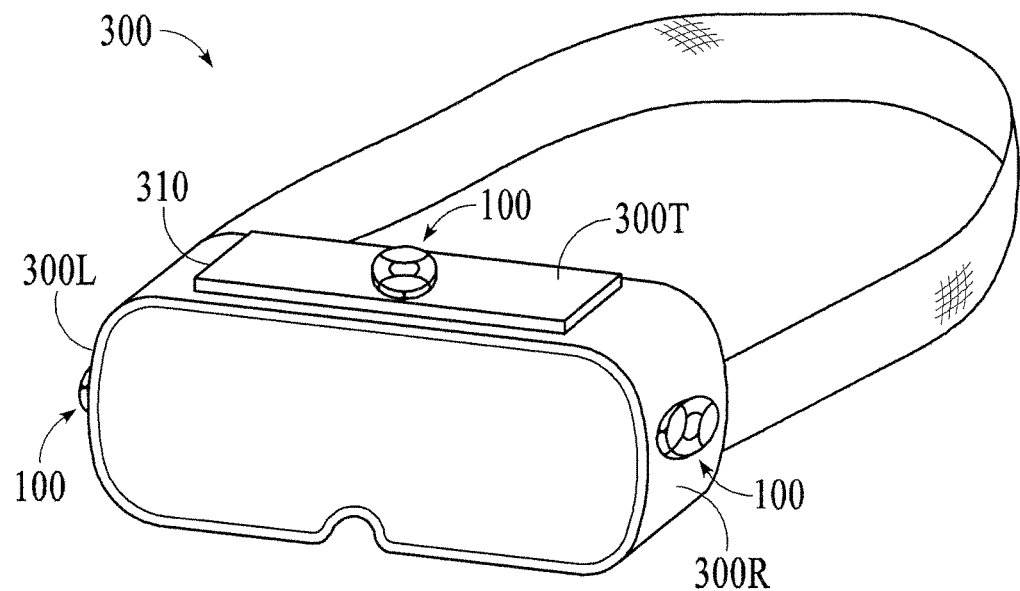
FIG. 3 is a perspective view of one embodiment of an HMD that has multiple gestural controllers of FIG. 1 removably mounted thereon.

FIG. 3 is a perspective view of one embodiment of an HMD 300 that has multiple single controller disk gestural controllers 100 of FIG. 1 removably mounted thereon. As shown, the HMD 300 also contains a slot 310 for insertion of an electronic device such as a smartphone, which can include a viewable display. In this preferred embodiment, three different single controller disks 100 are removably inserted onto the HMD 300, one on each side surface 300L and 300R, and one in the middle top surface 300T. The HMD 300 also has an integrated projection delivery system 320 for illuminating the lens of the display of the HMD, as well as providing audio, in a manner that is conventional. The integrated projection delivery system 320 integrates with the various single controller disks 100 using control signals that are similar to those conventionally used when an HMD interfaces with a mouse and a keyboard, but instead receives the signals from single controller disks 100, as described above. In a preferred embodiment, the single controller disk 100 attached to the middle top surface 300T remains in place and is used to track head motion, whereas the single controller disks that are attached to the side surfaces 300L and 300R are removed, and each then attached to a finger of a different hand, as described further herein. As such, the three different single controller disks 100 are used to track the motion of the head, the left hand, and the right hand, which is particularly suitable for usage in a Virtual Reality and/or Augmented Reality application.

It is understood that in other embodiments, the multiple single controller disk gestural controllers 100 need not be removably mounted to the HMD, but can be separate from physically, though when in use still in wireless communication with, the integrated projection delivery system 320 that is disposed on the HMD.

Even more generally, data from N sensors that are placed at different positions and orientations relative to the centroid of the HMD is combined. Each sensor is some combination of accelerometers, gyroscopes and magnetometers. The positions and orientations are determined using a multi-objective cost function that weights overall accuracy, variance and robustness across multiple test conditions along with geometrical constraints, to name a few. The accelerometer, gyroscope and magnetometer readings are preferably averaged together to reduce the noise. In addition, Kalman filters are preferably used to accurately model the noise in these sensors to thus further reduce their noise. The accelerometers are used to emulate a gyro by re-constructing angular acceleration as well as angular velocity. The magnetometer array allows for a faster calibration time which translates to less heading drift and better performance in magnetically disturbed environments.

Figure 4:
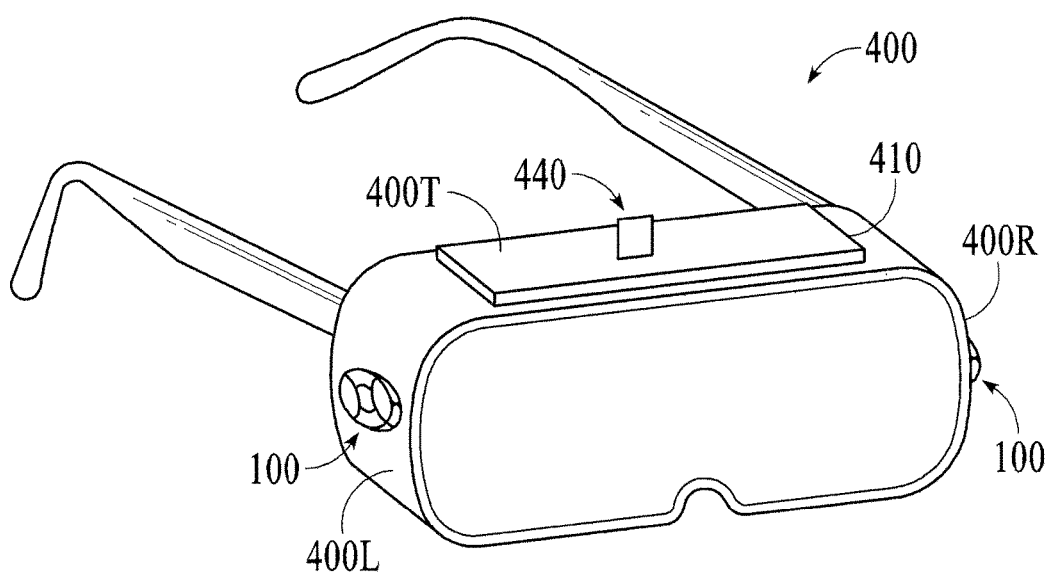
FIG. 4 is a perspective view of another embodiment of an HMD that has multiple gestural controllers of FIG. 1 removably mounted thereon.

FIG. 4 is a perspective view of another embodiment of an HMD 400 that has multiple single controller disk gestural controllers 100 of FIG. 1 removably mounted thereon. This embodiment is similar to the embodiment described in FIG. 3, but instead of a slot to hold an electronic device that has a display therein, instead includes a grip 410, which is preferably adjustable and has an outer rubber surface at least at points of contact with the electronic device, for firm holding thereof on the HMD 400.

In another embodiment shown in FIG. 4, the HMD contains a camera 440 outputting a video stream, which video stream is used for detecting the hand and extracting depth information to position the hand in front of the HMD. By processing this information from the camera 440, the skeletal pose of one's own hand can be extracted, based upon the other teachings discussed herein. This skeletal pose can also be enhanced and tracked accurately by combining with the other multiple single controller disk gestural controllers 100 on the body.

While the HMD embodiments are shown as a frame with goggles that cover both eyes, it is understood that the HMD as described herein can be adapted to be viewable by either or both eyes, and mounted accordingly on the frame of glasses or the like.

Figure 5:
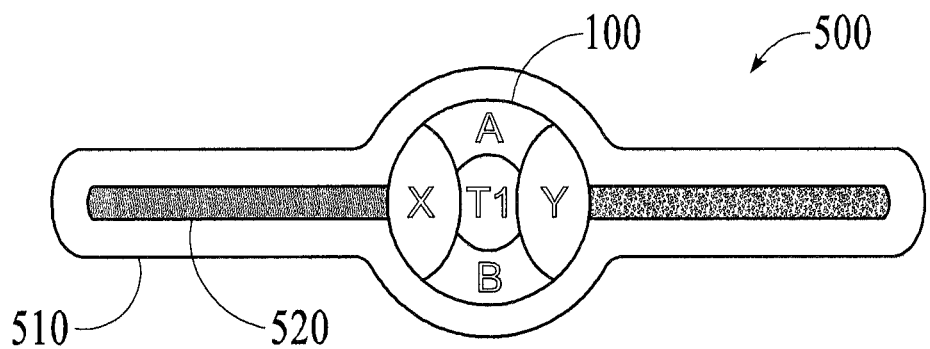
FIG. 5 is a top view of a gestural controller of FIG. 1 removably mounted to a wrist strap.

FIG. 5 is a view of a single controller disk gestural controller of FIG. 1 removably mounted to a wrist strap 500. As shown, the wrist strap 500 includes a bendable and non-conductive strap portion 510, with a metal band 520 disposed therein for providing a reference ground plane used for capacitive touch sensing.

Figure 6:
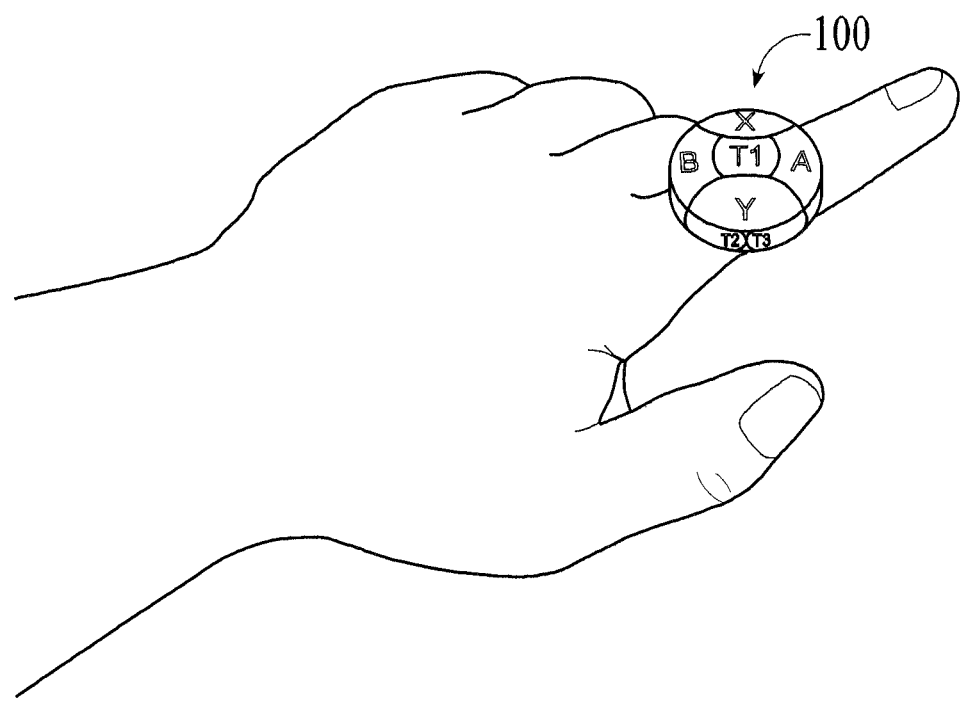
FIG. 6 is a view of a gestural controller of FIG. 1 removably mounted to a finger strap.

FIG. 6 is a view of a single controller disk gestural controller of FIG. 1 removably mounted to a finger strap or metal ring.

FIG. 7 is a top view of a single controller disk gestural controller of FIG. 1 inserted for charging and storage into a compartment 710 of a computer 700 or other electronic device, in which charging occurs internally, with power being supplied from the computer or other electronic device.

Figure 8A:
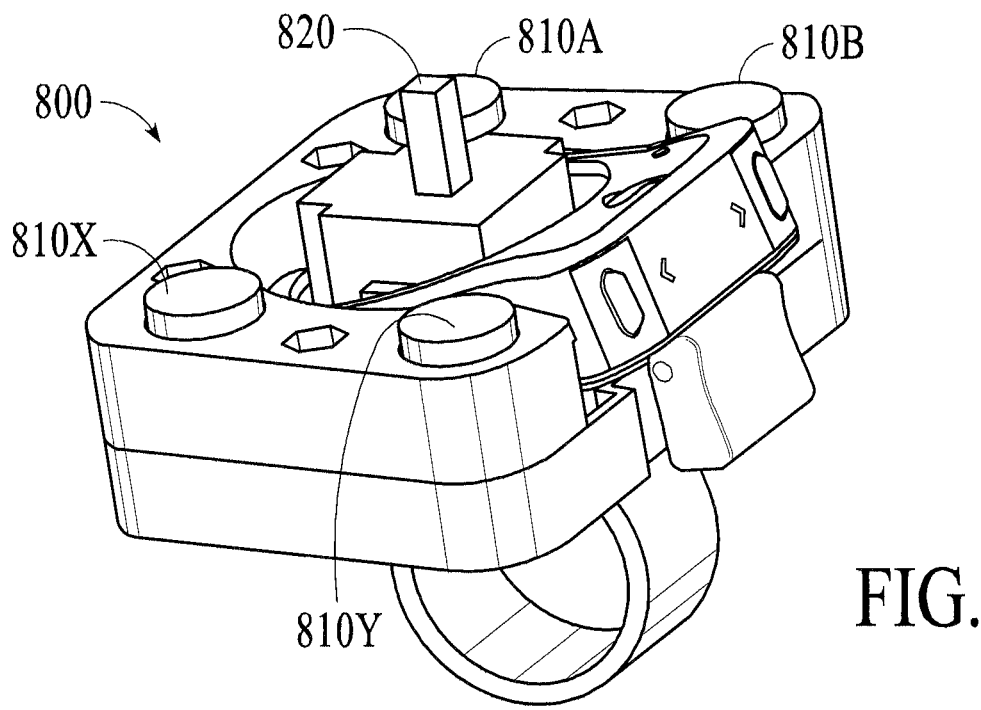
FIGS. 8A-B are a perspective view of a game controller version of a gestural controller.
Figure 8B:
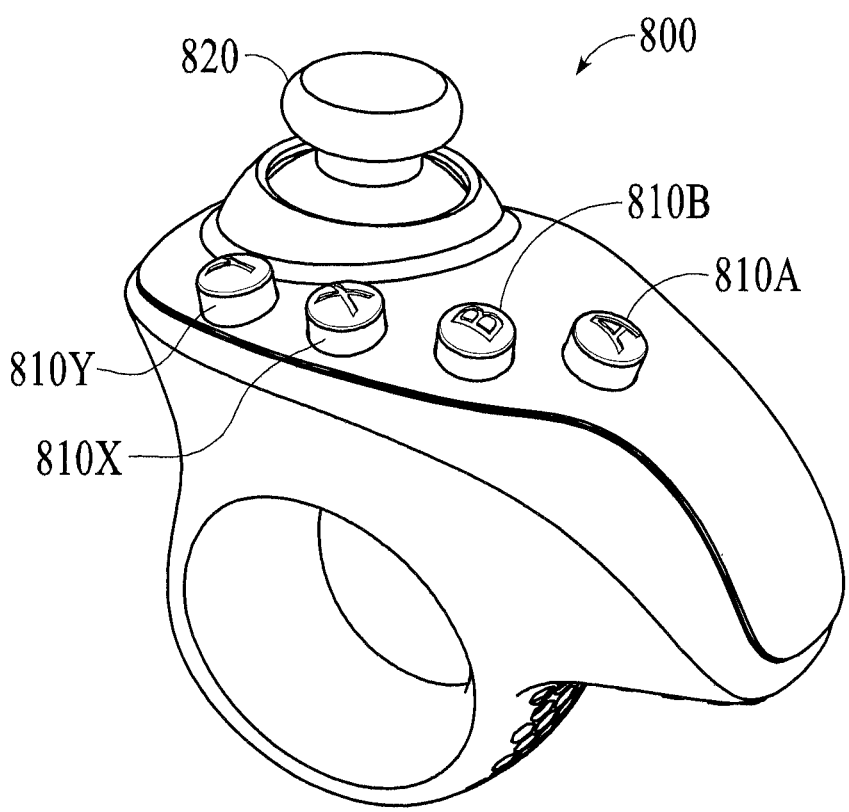

FIGS. 8A-B are perspective views of a game controller version of a gestural controller 800, with FIG. 8A illustrating the inner mechanical structure, and FIG. 8B showing the completed game controller version of a gestural controller. In addition to having A, B, X, Y inputs 810, there is also a joystick 820, as shown. This operates as a typical game controller, though is a miniature version, as it is wearable, as shown on a finger ring, using the hardware of, for example, the ring sensor described above and software is programmed to implement the conventional game controller inputs.

Although the present inventions are described with respect to certain preferred embodiments, modifications thereto will be apparent to those skilled in the art.

What is claimed:

1. An apparatus that is worn on the head and is viewable by an eye of a human, wherein the human has a torso and a plurality of limbs, the apparatus comprising:

a head mounted display device that includes a frame and a lens therein;
integrated projection delivery system that illuminates the lens of the head mounted display device; and
a plurality of motion sensor devices, removably attached to the frame of the head mounted display device; wherein each of the plurality of motion sensor devices, when removed from the head mounted display device and mounted onto one of the plurality of limbs, wirelessly outputs a sequence of motion signals to the integrated projection delivery system that correspond to a changing position of the one limb.

2. The apparatus according to claim 1 wherein the plurality of motion sensor devices includes a first, second and third motion sensor device, and wherein:
the first motion sensor device is not removed from the head mounted display device and outputs a sequence of first motion signals to the integrated projection delivery system that correspond to a changing position of the head of the human;
the second motion sensor device, when removed from the head mounted display device, is mounted on a limb corresponding to one arm, and outputs a sequence of second motion signals to the integrated projection delivery system that correspond to a changing position of the one arm; and
the third motion sensor device, when removed from the head mounted display device, is mounted on another limb corresponding to another arm different from the one arm, and outputs a sequence of third motion signals to the integrated projection delivery system that correspond to a changing position of the another arm.

3. The apparatus according to claim 1, wherein each of the plurality of motion sensors includes a power-up and initialize routine that begins upon removal from the head mounted display device.

4. The apparatus according to claim 3 wherein the initialize routine includes establishing a reference co-ordinate system to start tracking the motion of the motion sensor.

5. The apparatus according to claim 1 further including a fastener on at least some of the plurality of motion sensors that allow fastening of each of the at least some of the plurality of motion sensors to a garment.

6. The apparatus according to claim 1 wherein the plurality of motion sensor devices includes first and second motion sensor devices, and wherein:
the first motion sensor device, when removed from the head mounted display device, is mounted on a limb corresponding to one arm, and outputs a sequence of first motion signals to the integrated projection delivery system that correspond to a changing position of the one arm; and
the second motion sensor device, when removed from the head mounted display device, is mounted on another limb corresponding to another arm different from the one arm, and outputs a sequence of second motion signals to the integrated projection delivery system that correspond to a changing position of the another arm.

7. The apparatus according to claim 6 further including a camera mounted to the head mounted display device, the camera outputting a video stream to the integrated projection delivery system; and
wherein the integrated projection delivery system operates upon the video stream to detect a hand position and extract a skeletal pose of the hand position.

\* \* \* \* \*